Sept. 27, 1949.  W. H. COOK  2,482,967

RECIPROCATING CYLINDER ENGINE

Filed Dec. 31, 1946  2 Sheets-Sheet 1

Inventor
William H. Cook

Attorney

Sept. 27, 1949.                    W. H. COOK                    2,482,967
                          RECIPROCATING CYLINDER ENGINE
Filed Dec. 31, 1946                                        2 Sheets-Sheet 2
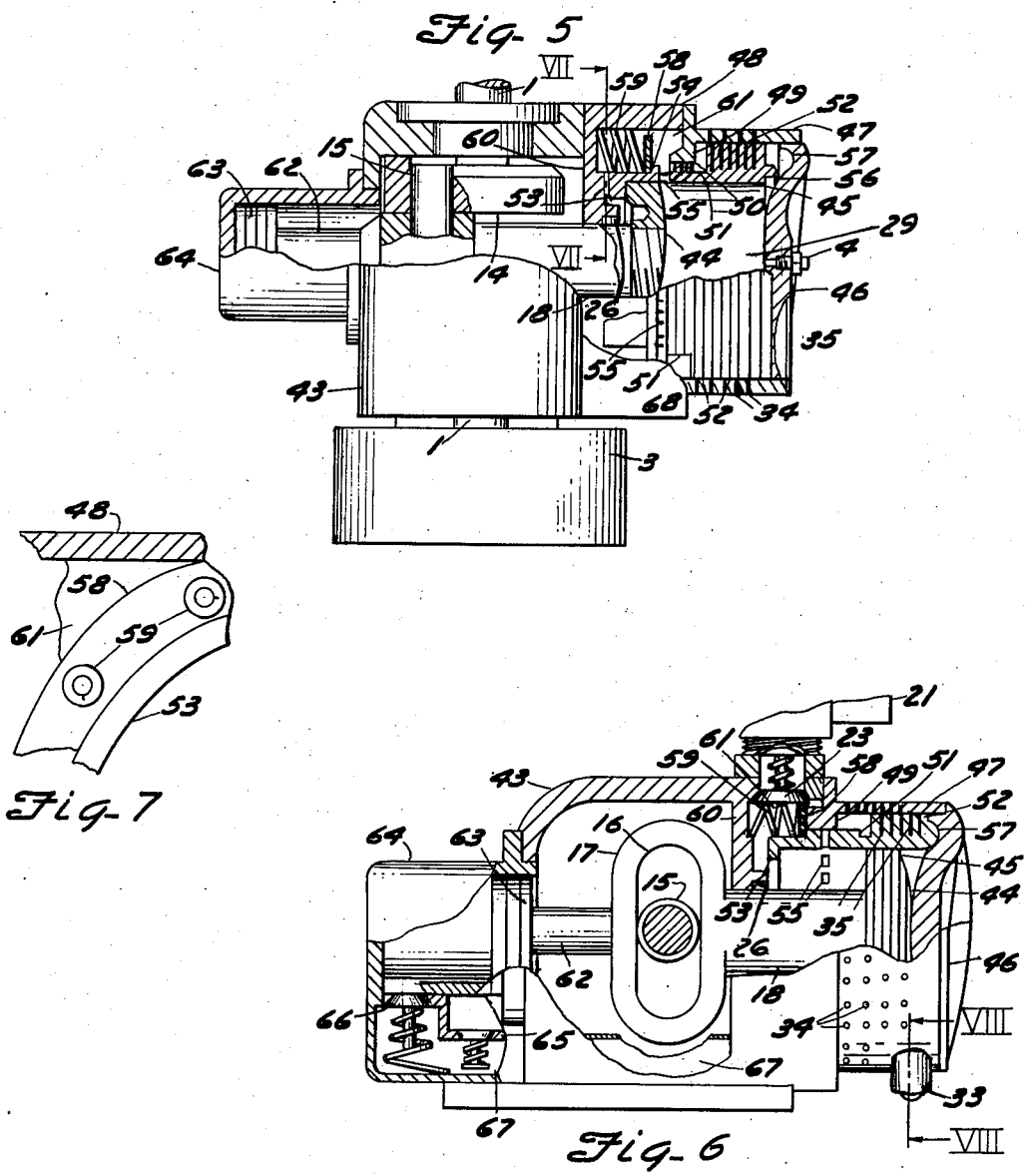
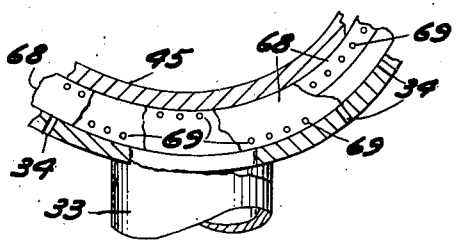
Inventor
William H. Cook
By
Geo E Kirk
Attorney Patented Sept. 27, 1949

2,482,967

UNITED STATES PATENT OFFICE 2,482,967

RECIPROCATING CYLINDER ENGINE

William H. Cook, Toledo, Ohio

Application December 31, 1946, Serial No. 719,518

6 Claims. (Cl. 123—50)

This invention relates to compact power unit of the reciprocating cylinder engine.

This invention has utility when incorporated in a piston and cylinder type of gas engine, wherein the exhaust take-off is in connection with cylinder cooling intake draft.

Referring to the drawings:

Fig. 5 is a single explosion chamber embodiment of the power unit wherein the externally ribbed explosion chamber travel is less than the power stroke, the showing being in plan;

Fig. 6 is a side elevation, partly in section, of the unit of Fig. 5, with the coacting parts at compression or firing position;

Fig. 7 is a fragmentary detail on the line VII—VII, Fig. 5, showing the explosion chamber shifting springs; and Fig. 8 is a detail sectional view on the line VIII—VIII, Fig. 6, showing the staggered ports of the explosion chamber external ribs for air-cooling the motor.

Figure 1:
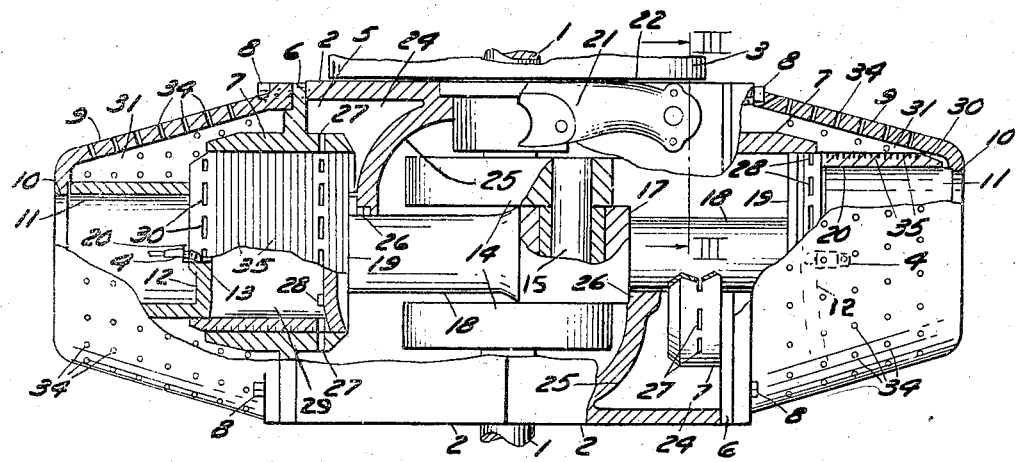
Fig. 1 is a plan view, with parts broken away, of an embodiment of the invention in an opposed pair of explosion chamber elements in a two cycle gas engine power unit.
Figure 2:
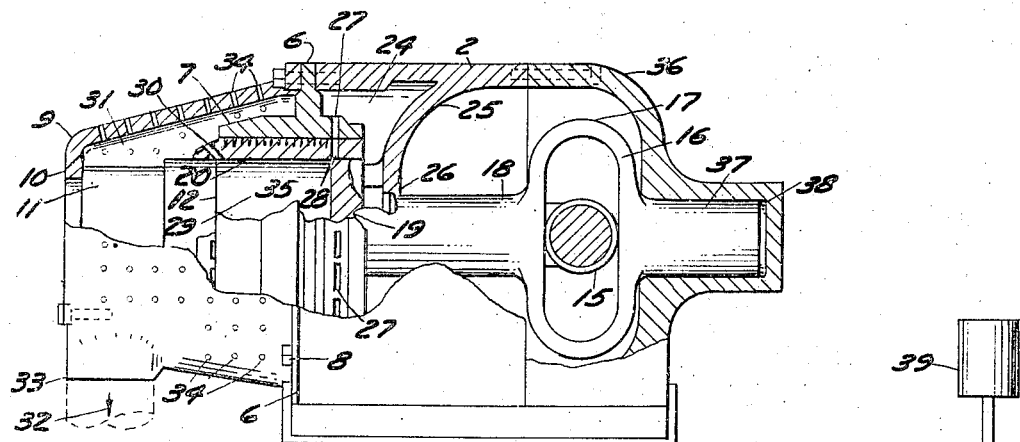
Fig. 2 is a fragmentary side view of a single cylinder two cycle gas engine power unit, of the general characteristics of the unit of Fig. 1.
Figure 3:
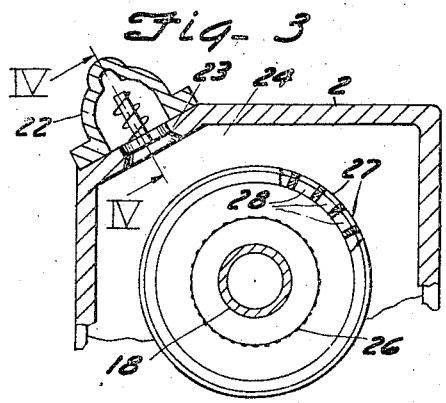
Fig. 3 is a sectional view on the line III—III, Fig. 1, looking in the direction of the arrow, and showing the intake for the fuel and air combustion mixture.

A driven shaft 1 (Fig. 1) protrudes from a housing 2. Fixed on the shaft 1 is a magneto 3 having ignition control connections to spark plugs 4. At open side 5 of the housing 2 is a flange or partition 6 carrying a guide sleeve and external bearing element 7. Connected to the housing 2 thru the partition 6 by assembly bolts 8 is a housing extension 9 having an open end 10, inwardly from which extends an internal bearing or guide 11, concentric with the element 7, but axially outward therefrom. The cylindrical bearing 11 at its inner terminus has a closure or head 12 with a central opening 13 therein to mount the spark plug 4.

The shaft 1 has a pair of crank arms 14 connected by a crank pin 15 extending thru a yoke slot 16 of a yoke 17. In a radial direction from the shaft 1 in the housing 2, the yoke 17 has a rod 18 to a head 19 from which extends an explosion chamber wall 20 reciprocable as directed by the guide bearings 7, 11.

A carburetor 21 may be mounted on a fixture 22 at the housing 2 in providing an air and fuel combustion mixture. A normally closed check valve 23 may connect combustion mixture supply from the carburetor 21 thru the fixture 22 into a precompression chamber 24 in the housing 2. The chamber 24 in the housing 2 is between the partition 6 and a housing wall 25 having a packing guide 26 for the rod 18. There is conversion of reciprocation of the rod 18 into rotation of the shaft 1. Outward movement of the rod 18 moves the head 19 into the bearing 7 away from the chamber 24. This travel of the head 19 away from the chamber 24 tends to develop a pressure drop or suction in the chamber 24 to unseat the valve 23 and draw in a supply of combustion mixture. This fuel intake interval may take place for the full outstroke of the head 19 toward the head 12.

Upon the reverse, or inward travel of the head 19 away from the head 12, fuel compression develops in the chamber 24, and the valve 23 is seated to hold this fuel charge. Advantage is taken in this disclosure for providing a precompression volume in excess of the spill therefrom into the explosion or combustion chamber.

The precompressed fuel charge in the chamber 24, upon the reciprocable means reaching its inward stroke limit has the rod 18 draw the head 19 to have radial ports or annular series of slots 27 in the sleeve member 7 register with annular series of slots 28 in the wall 20. Accordingly, this is intake port operation to charge combustion chamber 29 within the wall 20 between the heads 19, 12, with combustion mixture.

The precompression of the mixed fuel and air in the chamber 24, as entering the chamber 29 is peripheral in its extent. At this position for the wall 20, which still has a slight overhang on the relatively fixed trunk piston-like element 11, 12, a second annular series of ports or slots 30 in the wall 20, are just clear of the head 12. Accordingly, it follows that the inrush of fresh fuel from the chamber 24, is generally dispersed thruout the chamber 29 for effectively scavenging the previously exploded charge into exhaust chamber 31 in the extension 9 outward from the partition 6 and having inner wall portions 7, 11. A constant suction exhaust pull 32 is maintained by a fan or blower on exhaust duct 33. In practice this means that the warm explosion spent gases from the chamber 29 into the chamber 31, have most ready escape by way of the duct 33. Appropriately distributed for approximating uniform peripheral cooling of the power unit, are small openings or ports 34 thru the wall of the housing extension 9. There is thus effected a general distribution of cooler outside air with the exhaust gases in dissipating any noxious characteristics thereof, as well as pulling down the temperature of muffler release. Under the preferred practice, the pull 32 is sufficient to eliminate back pressure in the exhaust. However, the distributed intake and its cooperative distributed discharge, seem to respond for having the fuel and air combustion mixture brought to a proper temperature for efficient ignition by the spark plug 4. The multi-port entrance and discharge to the combustion chamber serve in high speed motor operation for efficient scavenging at relatively low port velocities.

The exterior of the explosion chamber wall 20 between the ports or slots 27 intake and 30 exhaust, has a plurality of annular grooves 35. The ribs thus formed between the grooves 35 provide extended surface area for the explosion chamber cooling from the enveloping fresh air intake ports 34. At the compression interval for combustion charge firing, the ports 28 do not register outside of the sleeve 7. The explosion charge pressure is thus held for the return or power stroke of the unit. During this power stroke, the rib and groove exterior of the wall 20 is within the sleeve 7, or rather from exposure in the exhaust chamber 31, telescopes into the sleeve 7. The heating up of this wall 20 is pulled down as the compression stroke following occurs in thrusting the wall 20 back into the exhaust chamber 31.

Instead of the two cylinder type of unit of Fig. 1, a single cylinder unit may be adopted, with a housing section 36 in lieu of the second section of the housing 2. Alignment of the head 19 and the cylinder-like element 20 therewith is promoted by a rod 37 slidable in a guide 38 of the housing 36.

Figure 4:
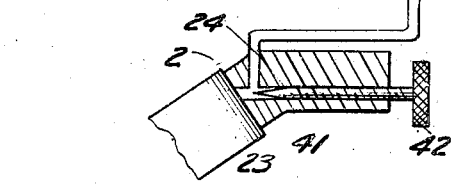
Fig. 4 is a partial section on the line IV—IV, Fig. 3, showing lubricating oil supply in conjunction with the fuel and air combustion mixture intake.

The major bearing surface for the relatively reciprocable elements is the interior of the sleeve 7 as toward the exterior of the wall 20. This surface to be lubricated is exterior of the explosion chamber. A lubricant supply reservoir 39 may have a duct 40 (Fig. 4) therefrom leading to seat 41 of the valve 23. The feed or supply of this lubricant to the unit may be adjusted by a needle valve 42. As the valve 23 becomes unseated for combustion mixture intake, the suction thereof may draw in therewith an adjustably limited quantity of lubricating oil. The atomized fuel as a carrier is thruout the chamber 24, even as the head 19 is toward the head 12. This means that the bearing wall inward of the element 7 is exposed for receiving lubricant condensation thereon during charge compression and the intake to the precompression chamber 24. To the extent that this lubricating oil condensation be effective, it is an additional cooling medium, coacting toward efficient motor performance.

Disk piston

The cranked shaft 1, 14, 15 (Fig. 5) in a housing 43 has its piston rod 18 connected to a disk piston 44 reciprocable in an explosion chamber 29 having a movable wall 45 adapted to be normally held against a fixed cylinder head 46 carried by a housing extension 47 from a precompression chamber housing section 48. The extension 47 adjacent the section 48, has an inwardly extending partition portion 49 providing a bearing 50 for a minor exterior diameter portion 51 of the wall 45. A larger diameter portion 52 of the wall 45 has guide bearing on the inner face of the housing 47.

Remote from the cylinder head 46, the wall 45, has an inwardly extending flange 53. Spaced from such end of the wall 45 is an outward flange 54, on the side thereof remote from the flange 53 having an annular series of slots or intake ports 55 just clearing the partition 49 as inward stroke limit of the piston 44 acts thru the flange 53 to draw the wall 45 clear of the cylinder head 46. This leaves a ring exhaust clearance 56 to an exhaust chamber 57 in the housing 47 adjacent the head 46.

Against the outward flange 54 is a ring 58 against which thrust an annular series of compression helical springs 59 in the housing section 48 against partition back 60 of the section 48. These springs 59 tend to move the wall 45 to exhaust port closing position. The piston rod 18 is thru a packing guide 26 in the partition 60 in closing a precompression chamber 61 in which the springs 59 are located.

The yoke 17, oppositely from the piston rod 18, has a piston rod 62 connected to a piston 63 in a cylinder 64 having intake check valve 65 and outlet check valve 66 to a passage 67 in communication with the precompression chamber 61. From a carburetor 21 past an intake check valve 23, mixed fuel and air supply may be drawn into the chamber 61, at charge compressing in the cylinder 45. As firing occurs, the piston 44 moves back in its power stroke, opening the intake ports 55 as the wall 45 is moved to provide exhaust clearance 56.

The travel of the piston 44 toward the partition 60, builds up pressure in the chamber 61. This causes the intake check valve 23 to be closed. The mixed fuel and air charge of combustion mixture has its pressure build up. This precompression building up is due to the piston 44 reducing the capacity of the chamber 61. At the same time the piston 63 is expelling a volume from the cylinder 64 to pass by the outlet valve 66 back into the passage 67 and into the chamber 61. This mixed fuel volume in the chamber 61 is such that as the piston 44 travels sufficiently to strike the flange 53 to open the annular series of ports 55, there is a complete circular inrush of fresh fuel mixture into the chamber 29. However, the movement of the combustion chamber wall 45 which effected opening of the ports 55 in moving them clear of the partition 49 closure therefor, shifted the wall 45 to provide the exhaust clearance 56. The complete exhaust ring opening 56 insures efficient forthwith scavenging of the products of combustion by the fuel inrush.

The explosion chamber movable wall 45 in its exterior regions 51, 52, has parallel grooves 35 to increase the exterior surface area in these bearing-providing face regions of this movable combustion chamber wall. Openings 34 are distributed thru the wall of the housing 47. Ribs 68 between the grooves 35, have in staggered relation therethru, ports 69 (Fig. 8). Exhaust suction upon exhaust duct 33 in its extent to a muffler from the motor unit, draws the products of combustion out of the exhaust chamber 57 in such volume that there is air replenishment thereto from the ports or openings 34 into the housing 47 to have devious course thru the staggered openings 69 in the ribs 68. By this means there is available definite air cooling of the internal combustion engine motor unit. The heat exchange in pulling down motor temperature is controlled by the exhaust removal rate and incidental thereto, the amount of proportion of the fresh incoming air thru the openings 34.

The combustion chamber sleeve member or wall 20, 45, as movable relatively to the fixed housing portion 7, 49, 47, primarily has its external bearing in the region of the ports 28, 55. The ribbed portions therefrom toward the exhaust end have in their outer extent more of guide coaction. To relieve the bearing of the ribs between the grooves 35, the bearing 11 centers and coacts with the interior open end of the explosion chamber wall 20. With the head not so extending into the wall 45 (Fig. 5), the ribs here between the grooves 35 have centering bearing coaction with the interior of the housing 41.

While there is efficient distribution herein for the ignition to effect flame propagation thruout for complete combustion, the fresh air intake at the exhaust distributed discharge from the combustion chamber, has such high temperature products as might have the combustion not quite complete, as for instance the presence of carbon monoxide, vitiated. The gas of this character as it emerges thru the small or thin port areas in a peripheral stream is still at a high enough temperature to carry on burning operation. The fresh air in-drawn thru the many ports 34 is warmed to approach burning. The distribution is so extended that there is fine commingling. This brings about a presence of the oxygen of the air with the carbon monoxid of incomplete combustion, but while still at a sufficiently high degree of heat to convert this residual poisonous gas to respiration into carbon dioxid. It follows that from this step of combustion chamber wall cooling, there is an efficient removal of noxious characteristics from the exhaust. Accordingly this motor has a much extended field for use, not requiring open air operation. Where the air circulation is sufficient to keep the carbon dioxid proportion healthfully low, the motor of this disclosure may be used indoors as stationary, or for haulage, as in mines and wide ranges of trucking about warehouses and in factory operations.

The materially widened field for industrial and general application of the gas engine as discussed is in the simple unit of few parts, light weight and compact, with a high degree of efficiency in operation. The provision for clearing out contaminating matter from exhaust gases, is a safety or precautionary measure. The centralized ignition means 4 is a sort of focal point toward which the annular intake port means tend to converge the mixed fuel and air charge for combustion. The distributed supply is a provision contributing to uniformly mixing the delivery to the spark plug 4. The kick from the explosion builds up the pressure thruout the chamber in effecting the expansion or power stroke. With the power about spent in performing machine operation for useful work, the exhaust annular way is opened. Simultaneously, from the opposite or remote end of the explosion chamber, the precompressed charge of mixed fuel and air enters. The adjustment and timing is such that the converging cross-flows from the intakes toward the ignition means 4, provide discharge impetus for the spent gases in the chamber to follow the most short route out of the chamber in passing in a relatively thin ring wall of exhaust. The volume of intake gases is quickly brought into the chamber at a relatively low flow rate thru the intake. This flow rate is below that tending to wire-draw or materially reduce the precompression pressure. It also is at such a flow rate as not frictionally to heat or waste its energy. However, the efficient amount of explosion heat, together with the charge compression for ignition, interact so that flame propagation develops rapidly, for minimum travel distance, due to central source of origin. This, together with the intake converging theretoward, and exhaust diverging therefrom, combine for such in-the-combustion-chamber lineal flow distance shortening as to have proven a material factor in efficient high speed motor design and operation.

In the event of over-scavenging, the distributed exhaust, incidental to its cylinder cooling function, may burn up such wasted fuel.

What is claimed and it is desired to secure by Letters Patent is:

1. An internal combustion engine comprising a combustion chamber having a parallel ribbed external bearing face providing clearance between the ribs, and a complementary bearing face fixed with the housing adapted to direct combustion chamber reciprocation in the latter face crosswise of the clearance between the ribs.

2. A two cycle gas engine comprising a housing providing a bearing and a fixed head, there being a combustion chamber in the housing adjacent the fixed head, and an exhaust chamber movable in the bearing away from the fixed head thereby to provide port communication between the chambers, said exhaust chamber providing a direct jacket for the combustion chamber.

3. A two cycle gas engine housing comprising a precompression chamber section, directly therefrom an exhaust chamber section mounting a fixed partition between the otherwise adjoining chambers of the sections and providing a bearing, a head fixed with the exhaust chamber section, and a combustion chamber reciprocable in the bearing toward and from the head and coacting at a position away from the head for annular port communication between the chambers to opposite sides of the partition.

4. A gas engine comprising a peripherally multi-ported housing section for an exhaust chamber therein, an externally ribbed explosion chamber in the exhaust chamber toward the ribs of which the multi-ports are directed, and take-off draft means from the exhaust chamber to bring in thru the multi-ports air cooling of the explosion chamber exterior and dispersion of exhaust gases to the take-off means.

5. An internal combustion chamber housing having an intake valve thereto, an explosion chamber having an external bearing and movable in the housing, and lubricant supply means for the bearing synchronized with the intake valve.

6. Supplemental combustion means for internal combustion engine exhaust comprising a combustion chamber externally ribbed cylinder having dispersed exhaust port means directly from the chamber, and heat conductor wall means about the cylinder for oxygen-containing fresh air to be prewarmed by the cylinder ribs and directed for distributed impingement into the dispersed exhaust.

WILLIAM H. COOK.

REFERENCES CITED

The following references are of record in the file of this patent:

UNITED STATES PATENTS

| Number | Name | Date |
| --- | --- | --- |
| 531,182 | Hain | Dec. 18, 1894 |
| 625,387 | Durr | May 23, 1899 |
| 1,139,770 | Joswich | May 18, 1915 |
| 1,149,179 | Brice | Aug. 10, 1915 |

FOREIGN PATENTS

| Number | Country | Date |
| --- | --- | --- |
| 361,847 | Great Britain | 1931 |